United States Patent
Earnshaw et al.

(10) Patent No.: US 10,411,807 B1
(45) Date of Patent: Sep. 10, 2019

(54) OPTICAL TRANSMITTER HAVING AN ARRAY OF SURFACE-COUPLED ELECTRO-ABSORPTION MODULATORS

(71) Applicant: Nokia Solutions and Networks OY, Espoo (FI)

(72) Inventors: Mark P. Earnshaw, Berkeley Heighs, NJ (US); Stefano Grillanda, Maplewood, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/946,061

(22) Filed: Apr. 5, 2018

(51) Int. Cl.
*H04B 10/516* (2013.01)
*G02F 1/21* (2006.01)
*G02F 1/225* (2006.01)

(52) U.S. Cl.
CPC ........... *H04B 10/516* (2013.01); *G02F 1/218* (2013.01); *G02F 1/225* (2013.01); *G02F 2202/108* (2013.01)

(58) Field of Classification Search
CPC ....... H04B 10/516; G02F 1/218; G02F 1/225; G02F 2202/108
See application file for complete search history.

(56) References Cited

U.S. PATENT DOCUMENTS

| | | | |
|---|---|---|---|
| 5,436,756 A | 7/1995 | Knox et al. | |
| 5,889,607 A | 3/1999 | Suzuki et al. | |
| 5,966,234 A | 10/1999 | Ford et al. | |
| 6,330,089 B1 * | 12/2001 | Yamada | H04B 10/516 398/9 |
| 6,466,349 B1 | 10/2002 | Valley et al. | |
| 6,853,479 B1 | 2/2005 | Ilchenko et al. | |
| 7,065,300 B1 | 6/2006 | Walker | |
| 7,223,993 B2 | 5/2007 | Nakahara et al. | |

(Continued)

OTHER PUBLICATIONS

Kang, I., "Phase-shift-keying and on-off-keying with improved performances using electroabsorption modulators with interferometric effects." Optics express 15.4 (2007): 1467-1473.

(Continued)

*Primary Examiner* — Leslie C Pascal
(74) *Attorney, Agent, or Firm* — Mendelsohn Dunleavy, P.C.; Yuri Gruzdkov

(57) ABSTRACT

An optical data transmitter in which surface-coupled reflective electro-absorption modulators are placed into different interferometer arms and operated in a manner that enables the optical data transmitter to transmit an optical output signal modulated using PAM, QPSK, or QAM modulation. In some embodiments, the optical data transmitter is configured to generate a PDM optical output signal by using two such interferometers and a quarter-wavelength plate configured to cause the output polarizations of the two interferometers to be mutually orthogonal. The electro-absorption modulators are surface-coupled in the sense that, in operation, each of these devices receives input light and outputs modulated light along a direction that is substantially orthogonal to the main plane of the device. In an example embodiment, an electro-absorption modulator includes a PIN diode comprising an MQW structure and implemented using a stack of relatively thin semiconductors layers that are parallel to the main plane of the device.

29 Claims, 9 Drawing Sheets

(56) References Cited

U.S. PATENT DOCUMENTS

| | | | |
|---|---|---|---|
| 7,443,561 | B2 | 10/2008 | Bour et al. |
| 7,583,894 | B2 | 9/2009 | Kang |
| 7,636,501 | B2 | 12/2009 | Doerr et al. |
| 7,929,813 | B2 | 4/2011 | Doerr et al. |
| 7,983,572 | B2 | 7/2011 | Deng |
| 8,754,445 | B2 | 6/2014 | Ishibashi et al. |
| 9,411,177 | B2 | 8/2016 | Cunningham et al. |
| 9,599,781 | B1 | 3/2017 | Skogen et al. |
| 9,823,497 | B1 | 11/2017 | Skogen |
| 9,838,135 | B1 | 12/2017 | Xu et al. |
| 9,853,416 | B2 | 12/2017 | Chen et al. |
| 2003/0010905 | A1 | 1/2003 | Luo |
| 2003/0201462 | A1 | 10/2003 | Pommer et al. |
| 2004/0109217 | A1* | 6/2004 | Maleki ............... G04F 5/00 359/239 |
| 2004/0136662 | A1 | 7/2004 | Takagi et al. |
| 2005/0141801 | A1 | 6/2005 | Gardner |
| 2008/0138088 | A1 | 6/2008 | Welch et al. |
| 2009/0116025 | A1 | 5/2009 | Maryfield et al. |
| 2010/0111466 | A1* | 5/2010 | Doerr ............... G02F 1/2257 385/3 |
| 2011/0044369 | A1 | 2/2011 | Andry et al. |
| 2012/0002978 | A1* | 1/2012 | Healey ............... G02F 1/225 398/183 |
| 2012/0263416 | A1 | 10/2012 | Morioka |
| 2012/0269514 | A1 | 10/2012 | Nedovic |
| 2012/0321316 | A1 | 12/2012 | Presi et al. |
| 2012/0328235 | A1 | 12/2012 | Christensen et al. |
| 2013/0256514 | A1 | 10/2013 | Devgan et al. |
| 2015/0125159 | A1 | 5/2015 | Kim et al. |
| 2017/0184450 | A1 | 6/2017 | Doylend et al. |
| 2017/0207600 | A1 | 7/2017 | Klamkin et al. |

OTHER PUBLICATIONS

Noharet, B., et al. "Arrays of surface-normal electroabsorption modulators for the generation and signal processing of microwave photonics signals." Microwave Photonics, 2011 International Topical Meeting on & Microwave Photonics Conference, 2011 Asia-Pacific, MWP/APMP. IEEE, 2011, pp. 282-283.

Quintana, C., et al. "High Speed Electro-absorption Modulator for Long Range Retroreflective Free Space Optics." IEEE Photonics Technology Letters 29.9 (2016): 707-710.

Schrenk, B., et al. "Flexible optical QAM generation with a low-complexity amplified InP SOA/EAM-based modulator." In Optical Communications (ECOC), IEEE, 2012 38th European Conference and Exhibition. pp. 1-3.

Wang, Qin, et al. "1550 nm transmissive/reflective surface-normal electroabsorption modulator arrays." Electronics Letters 42.1 (2006): 47-49.

Earnshaw, M. P., "Optical Apparatus With Paired Input and Output Planar Waveguides Coupled to a Reflective Modulator," U.S. Appl No. 15/445,099, filed Feb. 28, 2017, 56 pages.

Urino, Y., et al., "High density optical interconnects integrated with lasers, optical modulators and photodetectors on a single silicon chip." In Optical Fiber Communication Conference and Exposition and the National Fiber Optic Engineers Conference (OFC/NFOEC), 2013, pp. 1-3.

Raring, James W., and Larry A. Coldren. "40-Gb/s widely tunable transceivers." IEEE Journal of Selected Topics in Quantum Electronics 13.1 (2007): 3-14.

Hu, Ting-Chen, et al. "Communication System Employing Surface-Coupled Optical Devices", U.S. Appl. No. 15/946,161, titled, 28 pages.

Low, Y. et al. "Chip-In-Connector Photonic Apparatus", U.S. Appl. No. 15/946,353, 29 pages.

Neilson, D., "Reflective Optical Data Modulator", U.S. Appl. No. 62/653,152, 26 pages.

Earnshaw, M., "Optical Communication With Wavelength-Dependent Amplitude Pre-Compensation", U.S. Appl. No. 62/653,551, 18 pages.

\* cited by examiner

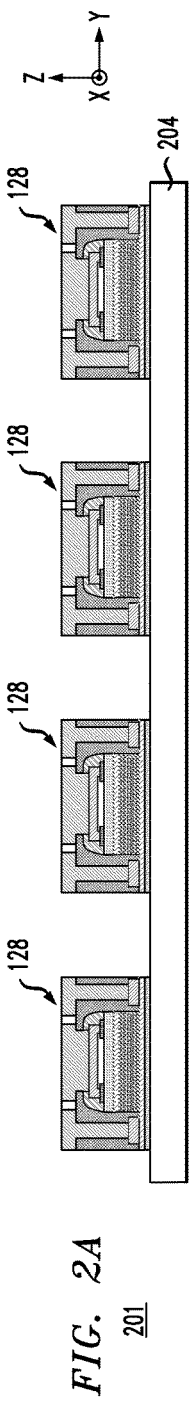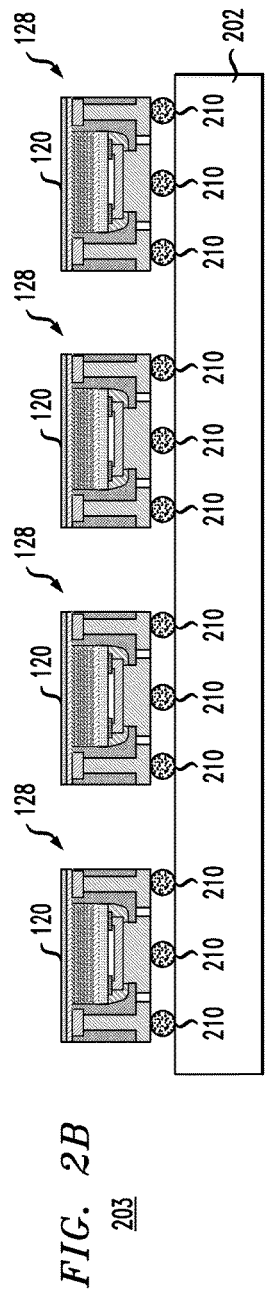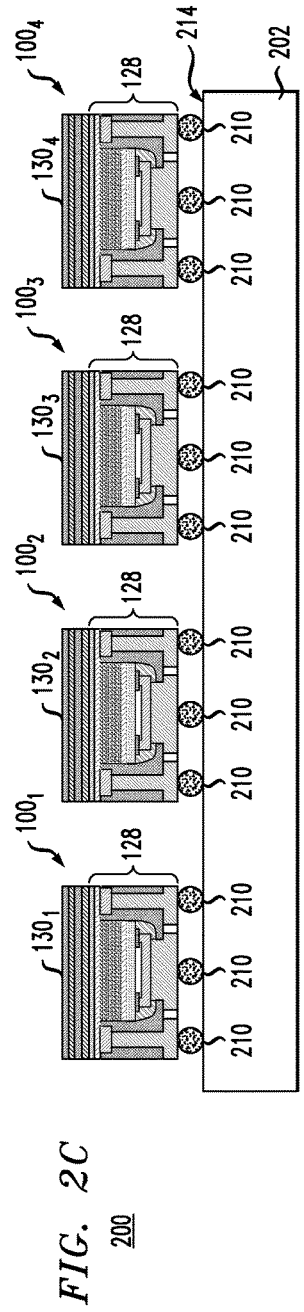
FIG. 2A
201
FIG. 2B
203
FIG. 2C
200

500

600

700

UNIPOLAR 4-PAM

| EAM1 OUTPUT | 4 | 4 | 8 | 8 |
|---|---|---|---|---|
| EAM2 OUTPUT | 3 | 1 | 3 | 1 |
| Tx OUTPUT | 1 | 3 | 5 | 7 |

800

900

| EAM1 | ON | ON | OFF | OFF | OFF | OFF | OFF | ON |
|---|---|---|---|---|---|---|---|---|
| EAM2 | OFF | ON | ON | ON | OFF | OFF | OFF | OFF |
| EAM3 | OFF | OFF | OFF | ON | ON | ON | OFF | OFF |
| EAM4 | OFF | OFF | OFF | OFF | OFF | ON | ON | ON |
| CONSTELLATION SYMBOL | 1 | 1+j | j | −1+j | −1 | −1−j | −j | 1−j |

OPTICAL TRANSMITTER HAVING AN ARRAY OF SURFACE-COUPLED ELECTRO-ABSORPTION MODULATORS

BACKGROUND

Field

Various example embodiments relate to optical communication equipment and, more specifically but not exclusively, to optical transmitters.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical modulator is a device that can be used to manipulate a property of light, e.g., of an optical beam. Depending on which property of the optical beam is controlled, the optical modulator can be referred to as an intensity modulator, a phase modulator, a polarization modulator, a spatial-mode modulator, etc. A wide range of optical modulators is used, e.g., in optical transmitters employed in the telecom industry.

SUMMARY OF SOME SPECIFIC EMBODIMENTS

Disclosed herein are various embodiments of an optical data transmitter in which a plurality of surface-coupled reflective electro-absorption modulators are placed into different interferometer arms and operated in a manner that enables the optical data transmitter to transmit an optical output signal modulated using pulse-amplitude modulation (PAM), quadrature-phase-shift-keying (QPSK) modulation, or quadrature-amplitude modulation (QAM). In some embodiments, the optical data transmitter is configured to generate a polarization-division-multiplexed (PDM) optical output signal by using two such interferometers and a quarter-wavelength plate configured to cause the output polarizations of the two interferometers to be mutually orthogonal.

The reflective electro-absorption modulators are surface-coupled in the sense that, in operation, each of these devices receives input light and outputs modulated light along a direction that is substantially orthogonal to the main plane of the device. In an example embodiment, a reflective electro-absorption modulator includes a PIN semiconductor diode comprising a multiple-quantum-well (MQW) structure and implemented using a stack of relatively thin semiconductors layers that are parallel to the main plane of the device. As a result, the optical data transmitter can be substantially insensitive to polarization fluctuations of the input light and can provide polarization diversity without the use of polarization controllers, polarization-maintaining fibers, and/or other relatively expensive polarization-control equipment.

According to an example embodiment, provided is an apparatus comprising: a plurality of reflective electro-absorption modulators supported along a planar surface, each of the reflective electro-absorption modulators being configured to receive input light and output modulated light substantially orthogonally to the planar surface; and an optical circuit optically coupled to the plurality of reflective electro-absorption modulators to form a first optical interferometer having a plurality of interferometer arms, each of the interferometer arms including a respective one of the reflective electro-absorption modulators; and wherein the first optical interferometer comprises a first optical coupler configured to generate a first modulated optical signal by optically combining the modulated light outputted by the respective reflective electro-absorption modulators in the plurality of interferometer arms in response to receipt of the input light.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 2A-2C pictorially illustrate a manufacturing method that can be used to make an array of SCEAMs of FIG. 1 according to an embodiment;

DETAILED DESCRIPTION

Some embodiments of the present application may be able to use some features, apparatus, and/or methods disclosed in one or more of the below-listed and concurrently filed U.S. applications:

U.S. patent application Ser. No. 15/946,161, titled "COMMUNICATION SYSTEM EMPLOYING SURFACE-COUPLED OPTICAL DEVICES", by Ting-Chen Hu and Stefano Grillanda;

U.S. patent application Ser. No. 15/946,353, titled "CHIP-IN-CONNECTOR PHOTONIC APPARATUS", by Yee Low and Nagesh Basavanhally;

U.S. Provisional Patent Application No. 62/653,152, titled "REFLECTIVE OPTICAL DATA MODULATOR", by David Neilson; and U.S. Provisional Patent Application No. 62/653,551, titled "OPTICAL COMMUNICATION WITH WAVELENGTH-DEPENDENT AMPLITUDE PRE-COMPENSATION", by Mark Earnshaw.

Each of the above-listed U.S. applications is incorporated herein, by reference, in its entirety.

Figure 1:
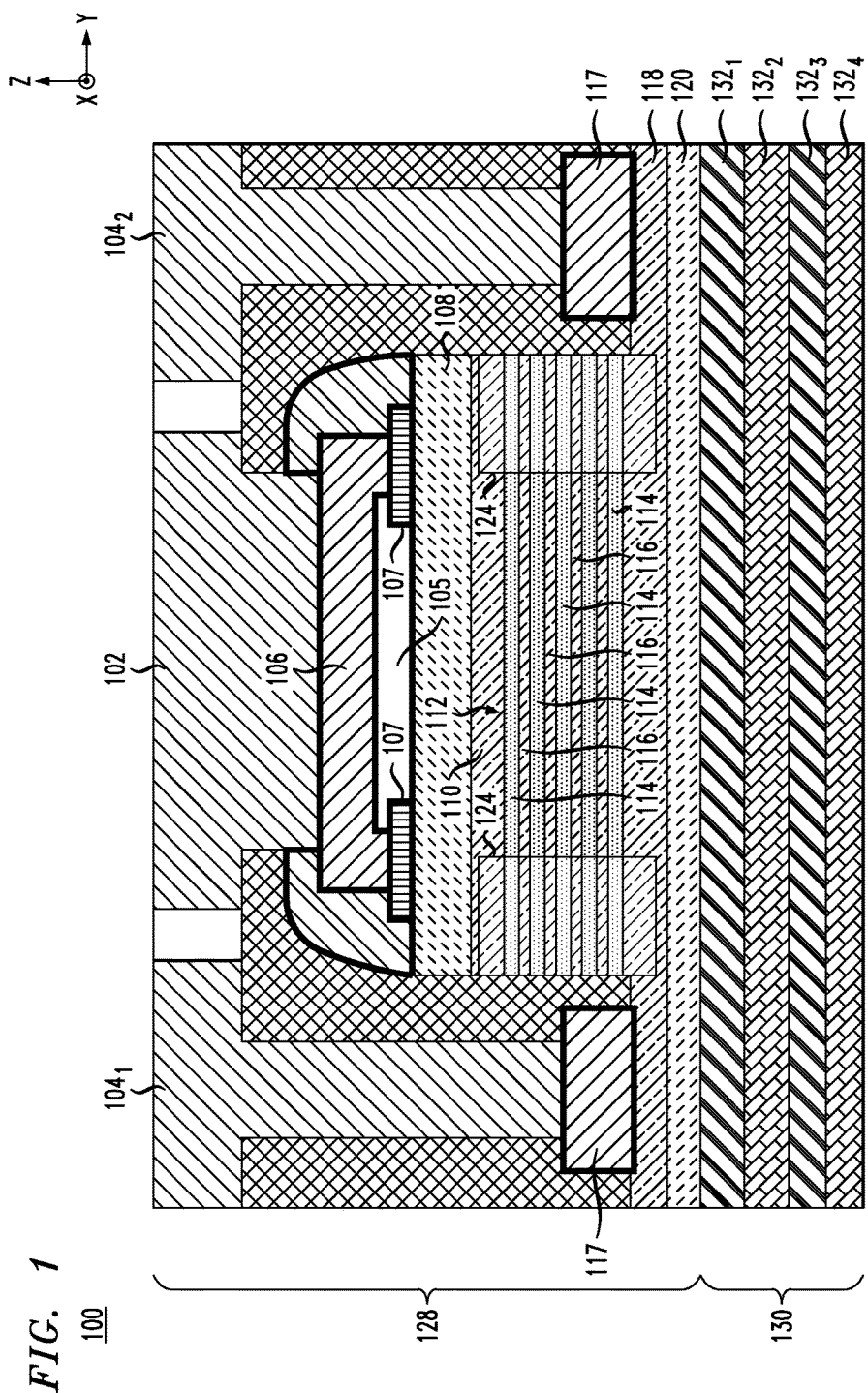
FIG. 1 shows a schematic cross-sectional side view of a surface-coupled electro-absorption modulator (SCEAM) according to an embodiment.

FIG. 1 shows a schematic cross-sectional side view of a surface-coupled electro-absorption modulator (SCEAM) 100 according to an embodiment.

SCEAM 100 is "surface-coupled" in the sense that, in operation, this device receives an input light beam and emits a modulated light beam in a direction that is substantially orthogonal to the main plane of the device, which is parallel to the XY-coordinate plane of the XYZ triad shown in FIG. 1. The XY-coordinate plane typically corresponds to the main plane of the planar substrate on which the layered structures of SCEAM 100 are formed during fabrication (see, e.g., FIGS. 2A-2C). Due to this geometry, a large number of SCEAMs 100 can be manufactured on a single substrate (e.g., a semiconductor wafer).

SCEAM 100 includes a plurality of relatively thin layers that are substantially parallel to the XY-coordinate plane. The direction orthogonal to those layers (i.e., parallel to the Z-coordinate axis) may hereafter be referred to as the vertical or surface-normal direction. The directions parallel to those layers may hereafter be referred to as the horizontal or lateral directions. Some of the layers may include two or more sub-layers (not explicitly shown in FIG. 1) that differ from each other in chemical composition and/or the concentration and type of the introduced dopant(s). SCEAM 100 also includes metal electrodes 102 and $104_1$-$104_2$ electrically connected to some of the layers as described in more detail below. In an example embodiment, the vertical size (or thickness) of SCEAM 100 is significantly smaller than its lateral size (e.g., depth and/or width).

In some embodiments, metal electrodes $104_1$-$104_2$ can be electrically connected to one another by being parts of the same electrode having, e.g., an O-shape in the top view thereof (e.g., if viewed along the Z-coordinate axis).

SCEAM 100 comprises an optical resonator defined by mirrors 106 and 130.

In an example embodiment, mirror 106 is a metal (e.g., gold or gold-plated) mirror having relatively high (e.g., >99%) reflectivity at the nominal operating wavelength at the side of the mirror facing down (in the projection shown in FIG. 1). Mirror 106 is typically such that it does not allow any light to pass therethrough. As a result, the shown embodiment of SCEAM 100 can typically be used only in reflection.

In some alternative embodiments, mirror 106 can be replaced by a suitable distributed Bragg reflector (DBR) mirror. As known in the pertinent art, a DBR mirror can be formed, e.g., using a stack of semiconductor or dielectric layers, each having a quarter-wavelength thickness, with adjacent layers of the stack having alternating refractive indices.

In an example embodiment, mirror 130 is a partially transparent dielectric mirror that enables light of the nominal operating wavelength to be properly coupled into and/or out of the optical resonator. For illustration purposes and without any implied limitations, FIG. 1 shows an embodiment in which mirror 130 comprises four dielectric layers $132_1$-$132_4$. In an alternative embodiment, mirror 130 can be implemented using a different (from four) number of constituent dielectric layers.

In some embodiments, layers $132_1$ and $132_3$ comprise silicon dioxide, and layers $132_3$ and $132_4$ comprise silicon nitride. In an alternative embodiment, mirror 130 can be implemented using dielectric layers of other suitable chemical composition.

In some embodiments, mirror 130 can be replaced by a suitable DBR mirror made of semiconductor materials.

The optical resonator defined by mirrors 106 and 130 includes p-type semiconductor layers 108 and 110, n-type semiconductor layers 118 and 120, and a multiple-quantum-well (MQW) structure 112 sandwiched therebetween. MQW structure 112 comprises a stack of alternating relatively thin layers 114 and 116 made of different respective semiconductor materials. In an example embodiment, the semiconductor materials of layers 114 and 116 are intrinsic semiconductors. Layer 108 may have a higher dopant concentration than layer 110, such that layers 108 and 110 can be referred to as p+ and p layers, respectively. Layer 120 may similarly have a higher dopant concentration than layer 118, such that layers 120 and 118 can be referred to as n+ and n layers, respectively.

In the embodiment shown in FIG. 1, the optical resonator defined by mirrors 106 and 130 also includes an optional dielectric layer 105 located between mirror 106 and semiconductor layer 108. In an example embodiment, this layer comprises $SiO_2$ or $Si_3N_4$. In an alternative embodiment, layer 105 can be absent.

A person of ordinary skill in the art will understand that the choices of (i) the semiconductor materials for layers 108, 110, 114, 116, 118, and 120 and (ii) the vertical distance between mirrors 106 and 130 may depend on the intended operating wavelength of SCEAM 100. For example, different telecommunications applications may use different embodiments of SCEAM 100 designed for the spectral bands located near 850 nm, 1300 nm, and 1550 nm, respectively.

In some embodiments, SCEAM 100 may include additional layers (not explicitly shown in FIG. 1) located between layers 120 and $132_1$. An example of such layers can be one or more etch-stop layers and one or more buffer layers used in the manufacturing process, e.g., as explained below in reference to FIGS. 2A-2C.

In an example embodiment, the following semiconductor materials can be used to implement SCEAM 100: (i) Zn-doped In(x)Ga(1-x-y)Al(y)As for layer 108; (ii) Zn-doped In(x)Al(1-x)As for layer 110; (iii) In(x)Ga(1-x)As for layers 114; (iv) In(x)Al(1-x)As for layers 116; (v) Si-doped In(x)Al(1-x)As for layer 118; and (vi) Si-doped In(x)Ga(1-x-y)Al(y)As for layer 120. In alternative embodiments, other semiconductor materials and dopants can also be used.

In an example embodiment, layers 110 and 118 and MQW structure 112 form a p-i-n diode (also sometimes referred to as a "PIN diode") that can be electrically biased using electrodes 102 and 104. Ohmic contact between electrode 102 and layer 110 can be created using metal contact pads 107 and layer 108 as known in the art. Ohmic contact between electrode(s) 104 and layer 118 can be created using metal contact pads 117 and an additional thin n+ or n++ semiconductor layer (not explicitly shown in FIG. 1) located between contact pads 117 and layer 118.

In operation, electrodes 102 and 104 of SCEAM 100 are electrically connected to apply to PIN diode 110/112/118 a combination of an appropriate reverse bias and a driving radio-frequency (RF) signal.

As used herein, the term "reverse bias" refers to an electrical configuration of a semiconductor-junction diode in which the n-type material is at a high electrical potential, and the p-type material is at a low electrical potential. The reverse bias typically causes the depletion layer to grow wider due to a lack of electrons and/or holes, which presents a high impedance path across the junction and substantially prevents a current flow therethrough. However, a very small reverse leakage current can still flow through the junction in the reverse-bias configuration.

Similarly, the term "forward bias" refers to an electrical configuration of a semiconductor-junction diode in which the n-type material is at a low potential, and the p-type material is at a high potential. If the forward bias is greater than the intrinsic voltage drop $V_{pa}$ across the corresponding p-i-n junction, then the corresponding potential barrier can be overcome by the electrical carriers, and a relatively large forward current can flow through the junction. For example, for silicon-based diodes the value of $V_{pa}$ is approximately 0.7 V. For germanium-based diodes, the value of $V_{pa}$ is approximately 0.3 V, etc.

The principle of operation of SCEAM 100 in the EAM configuration is based on the so-called quantum-confined Stark effect (QCSE) due to which the optical absorption near the effective band edge of MQW structure 112 depends on the applied electric field. More specifically, the reverse bias applied to the PIN diode 110/112/118 causes MQW structure 112 to be subjected to an electric field of certain strength. The driving RF signal is typically an AC signal with a DC reverse bias offset, such that the effective bias remains reverse at any point in the driving cycle. During the positive swing of the driving RF signal, the electric-field strength increases relative to that at the DC bias point, thereby red-shifting the band edge. During the negative swing of the driving RF signal, the electric-field strength decreases relative to that at the DC bias point, thereby blue-shifting the band edge. These band-edge shifts change the light transmittance of MQW structure 112 at the carrier wavelength, thereby modulating the intensity of light that oscillates in the optical resonator between mirrors 106 and 130 and escapes from the optical resonator through mirror 130.

The lateral dimensions of the optical resonator in SCEAM 100 can be defined using an external aperture (not explicitly shown in FIG. 1) and/or ion-implanted regions 124. Ion-implanted regions 124 can be formed by implanting suitable ions (e.g., the hydrogen ions, $H^+$) into MQW structure 112 around its periphery, e.g., as indicated in FIG. 1. The ion-implantation process disrupts, perturbs, and/or destroys the semiconductor lattice in regions 124, thereby inhibiting the flow of electrical current(s) therethrough and/or hindering the physical processes therein that are pertinent to the above-described optical functions of SCEAM 100. In an example embodiment, the middle portion of MQW structure 112 laterally bounded by regions 124 may have an approximately circular cross-sectional shape in a plane parallel to the XY-coordinate plane. In alternative embodiments, other cross-sectional geometric shapes are also possible.

Encapsulating and/or filler materials can be used as known in the pertinent art to cover and/or fill the gaps (if any) between the various layers, structures, and electrodes of SCEAM 100, thereby providing a substantially monolithic and mechanically robust overall device structure.

One beneficial optical characteristic of SCEAM 100 is that its operation can be substantially polarization-independent due to the surface-coupled nature of this device. For comparison, waveguide-based semiconductor optical devices (e.g., lasers, amplifiers, modulators, and photodetectors) can be polarization-dependent, e.g., due to a relatively large difference in the group indices (i.e., effective refractive indices) of the transverse electric (TE) and transverse magnetic (TM) polarizations in the corresponding optical waveguides. Waveguide-based EAMs in particular can exhibit a large difference in the modulation depth for TE and TM polarizations due to the inherent anisotropy of the modulator structure with respect to those polarizations. This particular characteristic can make it relatively difficult to construct a polarization-diverse waveguide-based EAM device having a substantially polarization-independent response and/or capable of appropriately handling polarization-division-multiplexed (PDM) signals. Advantageously, the latter problem can be significantly alleviated or avoided altogether with the use of various embodiments of SCEAM 100.

FIGS. 2A-2C pictorially illustrate a manufacturing method that can be used to make an array 200 of SCEAMs 100 according to an embodiment.

FIG. 2C shows a schematic cross-sectional side view of array 200. For illustration purposes and without any implied limitations, FIG. 2C shows an embodiment in which array 200 comprises four SCEAMs 100, which are labeled $100_1$-$100_4$. In an alternative embodiment, array 200 may have a different (from four) number of SCEAMs 100.

SCEAMs $100_1$-$100_4$ are supported on and electrically and mechanically connected to a device carrier 202 using solder bumps 210 attached to electrodes 102, 104 (also see FIG. 1). The orientation of SCEAMs $100_1$-$100_4$ is such that mirrors 130 are facing away from a surface 214 of device carrier 202, on which the SCEAMs are mounted. Electrical connections between each of SCEAMs $100_1$-$100_4$ and the corresponding external electrical circuit(s) (such as, circuit 840, FIG. 8) can be provided by patterned conducting (such as metal) layers located within the body and/or on surface 214 of device carrier 202. In various embodiments, device carrier 202 can be implemented using any one or any suitable combination of the following: one or more substrates, one or more redistribution layers (RDLs), one or more interposers, one or more laminate plates, and one or more circuit sub-mounts, etc.

In some embodiments, SCEAMs $100_1$-$100_4$ can be nominally identical. In some other embodiments, SCEAMs $100_1$-$100_4$ may have nominally identical portions 128 (also see FIG. 1), but different respective mirrors $130_1$-$130_4$.

Array 200 of FIG. 2C can be fabricated by first forming a corresponding array 201 of portions 128 on a suitable substrate 204 as illustrated in FIG. 2A. In an example embodiment, substrate 204 can be an InP substrate. Portions 128 can be formed on substrate 204 in a conventional manner, e.g., using a multistep fabrication process comprising at least some of the following: photolithography, ion implantation, dry and/or wet etching, thermal treatments and anneals, oxidation, chemical and physical vapor deposition, epitaxial growth, electrochemical deposition, and chemical-mechanical planarization.

In the next fabrication step, array 201 is flip-chip bonded to device carrier 202 using solder bumps 210. After the flip-chip bonding, substrate 204 is removed, e.g., by reactive etching, thereby exposing layers 120 of portions 128 (e.g., as indicated in FIG. 2B) or the corresponding etch-stop layers (not explicitly shown in FIG. 2). Mirrors $130_1$-$130_4$ are then formed on the exposed top surfaces of the resulting circuit 203 (FIG. 2B), thereby converting the latter into array 200 (FIG. 2C).

Figure 3:
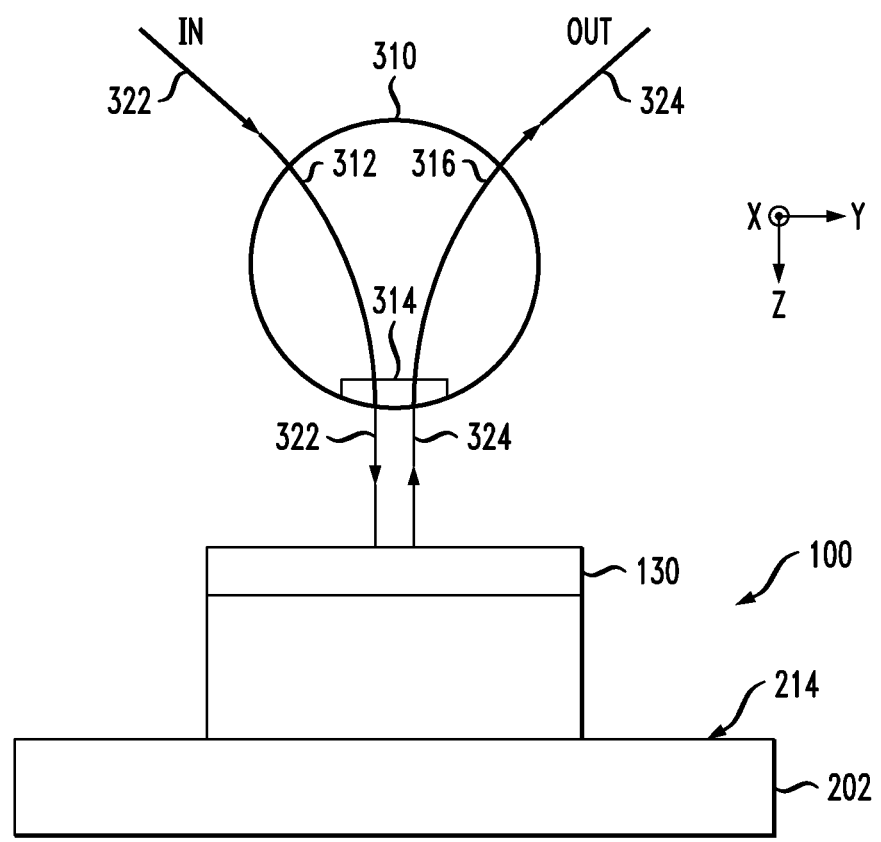
FIG. 3 shows a block diagram of an optical assembly that includes a SCEAM of FIG. 1 according to an embodiment.

FIG. 3 shows a block diagram of an optical assembly 300 according to an embodiment. Optical assembly 300 comprises a SCEAM 100 mounted on device carrier 202, e.g., as described above in reference to FIGS. 2A-2C. Optical assembly 300 further comprises an optical circulator 310 configured to couple light in and/or out of SCEAM 100.

Optical circulator 310 has three optical ports, which are labeled in FIG. 3 using reference numerals 312, 314, and 316, respectively. Port 312 is configured to direct an optical input beam 322 received from an external light source to port 314. Port 314 is configured to direct light of beam 322 toward mirror 130 of SCEAM 100. Port 314 is further configured to receive an optical output beam 324 emitted by SCEAM 100 through mirror 130 and direct it to port 316. Port 316 is configured to direct light of optical beam 324 to external circuits.

In some embodiments, one or more lenses (not explicitly shown in FIG. 3) may be placed between port 314 of optical circulator 310 and mirror 130 of SCEAM 100 to improve the optical coupling efficiency and/or reduce optical losses.

In some embodiments, an array of optical circulators 310 may be used to couple light in and out of array 200 (FIG. 2C).

Figure 4:
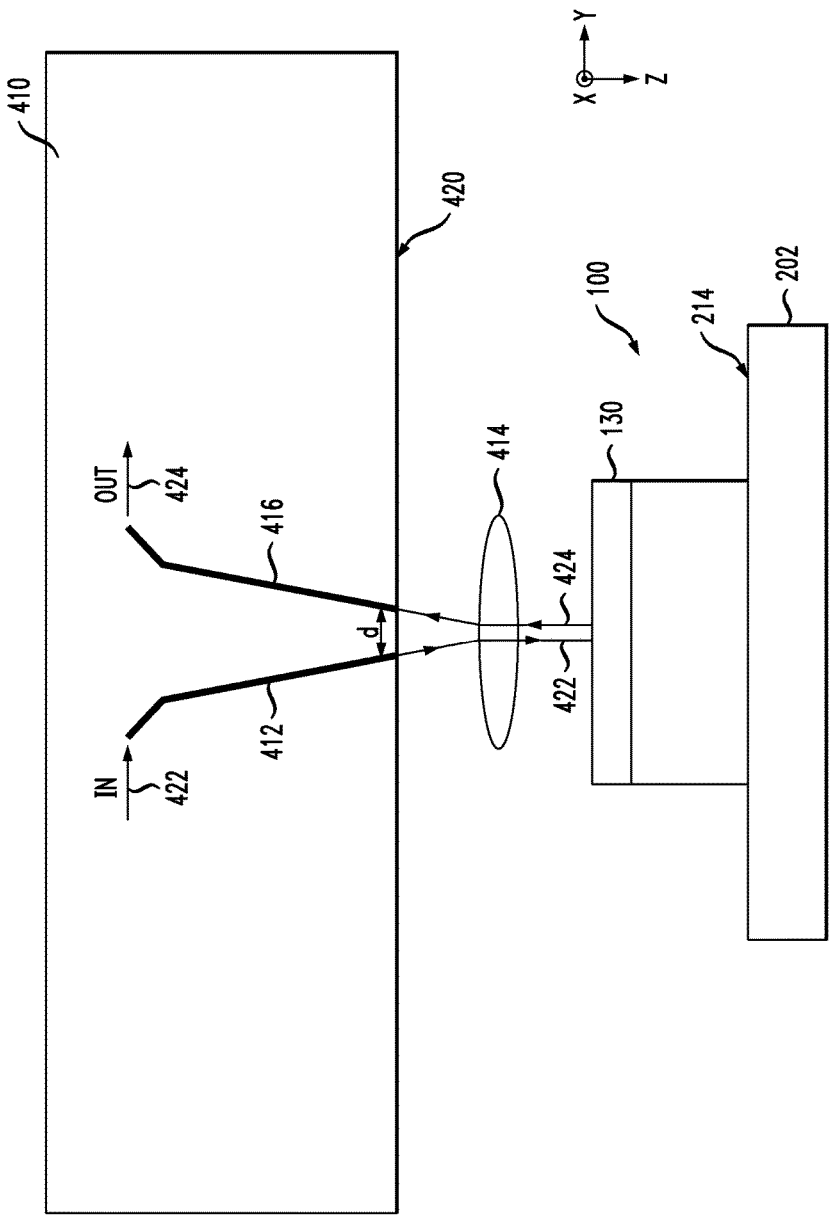
FIG. 4 shows a block diagram of an optical assembly that includes a SCEAM of FIG. 1 according to another embodiment.

FIG. 4 shows a block diagram of an optical assembly 400 according to another embodiment. Optical assembly 400 comprises a SCEAM 100 mounted on device carrier 202, e.g., as described above in reference to FIGS. 2A-2C. Optical assembly 400 further comprises a planar lightwave circuit (PLC) 410 configured to couple light in and/or out of SCEAM 100. The main plane of planar lightwave circuit 410 is parallel to the YZ-coordinate plane.

Circuit 410 comprises optical waveguides 412 and 416 connected to an edge 420 of that circuit as indicated in FIG. 4. More specifically, the end portions of waveguides 412 and 416 are oriented with respect to edge 420 at an angle that is slightly (e.g., within ±10 degrees) different from 90 degrees. The ends of waveguides 412 and 416 are separated from one another by a relatively small distance d selected such that both ends are in the field of view of a coupling lens 414 located between edge 420 of circuit 410 and mirror 130 of SCEAM 100.

Waveguide 412 is configured to direct, through lens 414, an optical input beam 422 received from an external light source toward mirror 130. Waveguide 416 is configured to receive, through lens 414, an optical output beam 424 emitted by SCEAM 100 through mirror 130 and direct it to external circuits. Lens 414 is configured to appropriately shape and redirect optical beams 422 and 424 to provide a relatively high optical-coupling efficiency between circuit 410 and SCEAM 100.

In some embodiments, circuit 410 may be used to couple light in and out of array 200 (FIG. 2C). In such embodiments, circuit 410 may have multiple pairs of optical waveguides 412 and 416 (not explicitly shown in FIG. 4; see, e.g., FIG. 6) connected to edge 420.

Additional embodiments of circuit 410 may be constructed and operated using waveguide circuits and optical arrangements disclosed, e.g., in U.S. patent application Ser. No. 15/445,099, which is incorporated herein by reference in its entirety.

Figure 5:
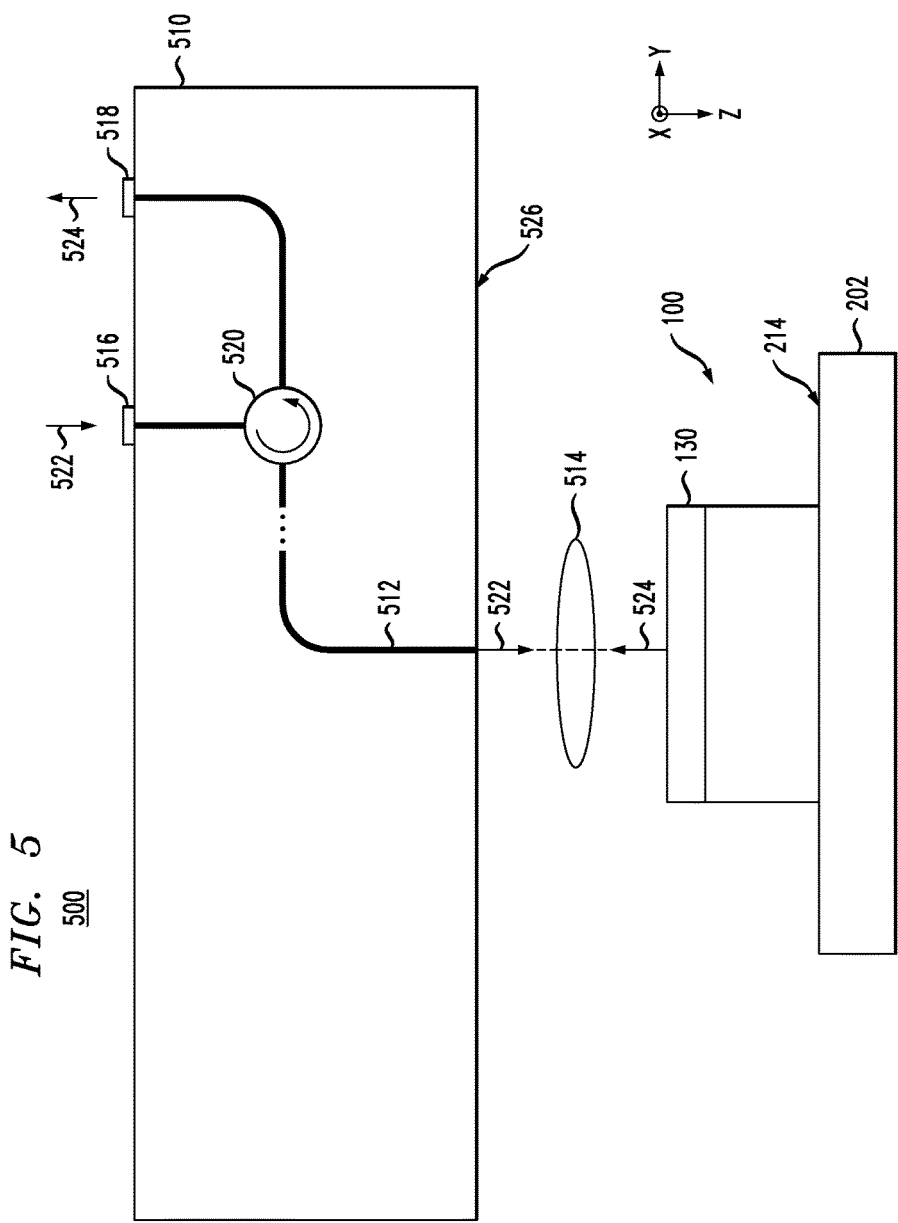
FIG. 5 shows a block diagram of an optical assembly that includes a SCEAM of FIG. 1 according to yet another embodiment.

FIG. 5 shows a block diagram of an optical assembly 500 according to yet another embodiment. Optical assembly 500 comprises a SCEAM 100 mounted on device carrier 202, e.g., as described above in reference to FIGS. 2A-2C. Optical assembly 500 further comprises a planar lightwave circuit 510 configured to couple light in and/or out of SCEAM 100. The main plane of planar lightwave circuit 510 is parallel to the YZ-coordinate plane.

Circuit 510 comprises an optical waveguide 512 connected to an edge 526 of that circuit as indicated in FIG. 5. More specifically, the end portion of waveguide 512 is orthogonal to edge 526 and is also orthogonal to mirror 130 of SCEAM 100. Circuit 510 further comprises an optical input port 516, an optical output port 518, and an optical circulator 520. Optical circulator 520 has three ports connected to optical waveguide 512, optical input port 516, and optical output port 518, respectively, as indicated in FIG. 5.

Figure 8:
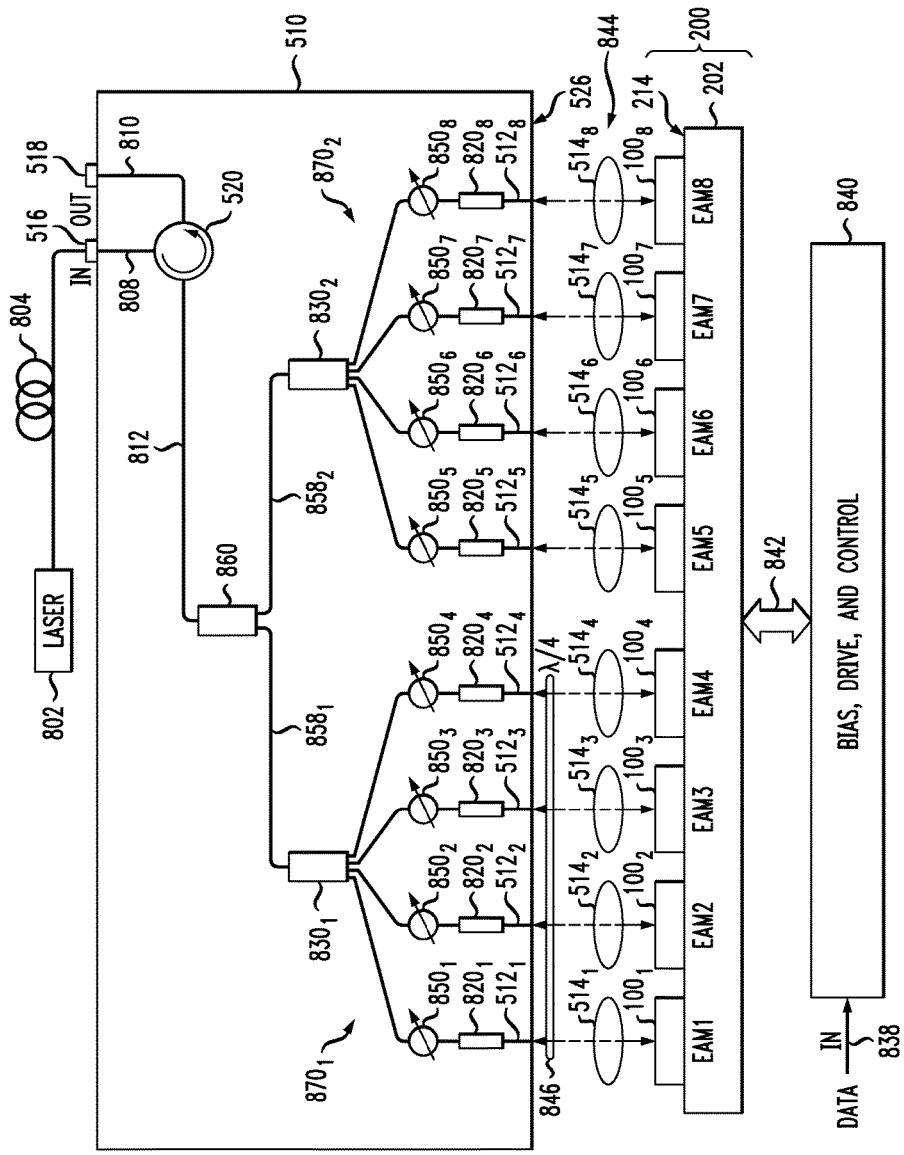
FIG. 8 shows a block diagram of an optical transmitter that includes an array of SCEAMs of FIG. 1 according to another embodiment.

In operation, optical input port 516 can be connected to an external light source (see, e.g., FIG. 8). Optical circulator 520 is configured to direct the light received through optical input port 516 into optical waveguide 512. Waveguide 512 is configured to: (i) direct, through a lens 514, an optical beam 522 received from optical circulator 520 toward mirror 130; (ii) receive, through lens 514, a modulated optical beam 524 generated by SCEAM 100 by modulating optical beam 522 and emitted through mirror 130; and (iii) direct the received light of modulated optical beam 524 back to optical circulator 520. Optical circulator 520 then operates to direct the light received from optical waveguide 512 to optical output port 518.

In an example embodiment, lens 514 is configured to appropriately shape and direct optical beams 522 and 524 to provide a relatively high optical-coupling efficiency between optical waveguide 512 and SCEAM 100.

In some embodiments, circuit 510 may be used to couple light in and out of SCEAM array 200 (FIG. 2C). In such embodiments, circuit 510 may have multiple optical waveguides 512 (not explicitly shown in FIG. 5; see, e.g., FIG. 8) connected to edge 526.

Figure 6:
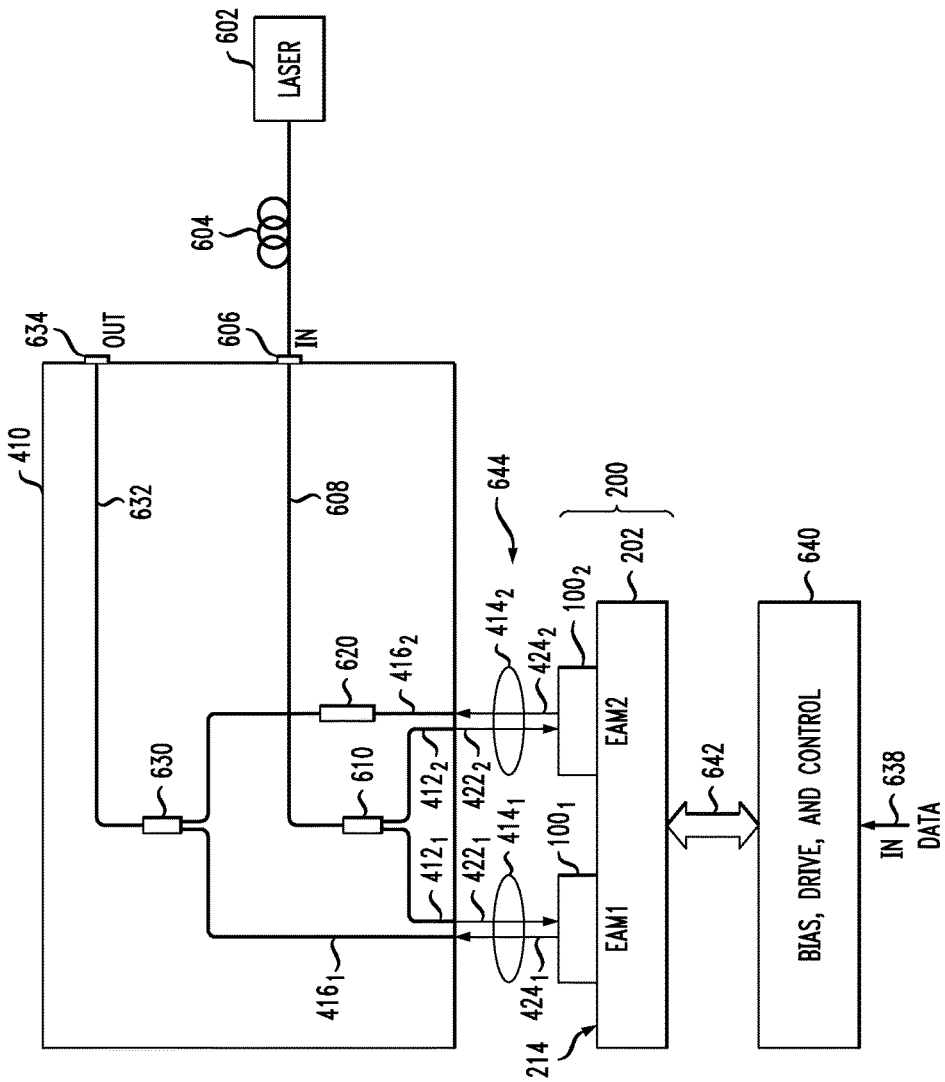
FIG. 6 shows a block diagram of an optical transmitter that includes an array of SCEAMs of FIG. 1 according to an embodiment.

FIG. 6 shows a block diagram of an optical transmitter 600 according to an embodiment. Transmitter 600 comprises: (i) an embodiment of SCEAM array 200 (also see FIG. 2C) that includes SCEAMs $100_1$ and $100_2$; (ii) an embodiment of planar lightwave circuit 410 (also see FIG. 4); (iii) a lens array 644 that includes lenses $414_1$ and $414_2$ (also see FIG. 4); (iv) an electrical circuit 640; and (v) a laser 602. Laser 602 is connected to an input port 606 of waveguide circuit 410 using an optical fiber 604. Electrical circuit 640 is connected to SCEAM array 200 using an electrical bus 642. In operation, circuit 640 can (i) provide respective bias voltages to SCEAMs $100_1$ and $100_2$ and (ii) generate respective electrical RF drive signals to be applied to SCEAMs $100_1$ and $100_2$ in response to an electrical analog data-input signal 638.

Optical transmitter 600 can operate, for example, as follows.

Laser 602 operates to generate a CW optical beam that is coupled, by way of fiber 604 and input port 606 into waveguide 608 of circuit 410. Waveguide 608 directs the received CW light to an optical splitter 610 that splits it into two portions and couples the two portions into waveguides $412_1$ and $412_2$, respectively. In an example embodiment, optical splitter 610 can be a 3-dB power splitter/combiner. In an alternative embodiment, optical splitter 610 having a different split ratio can similarly be used if appropriate or necessary for the intended type of modulation.

Waveguide $412_1$ outputs the light received from splitter 610 as an optical output beam $422_1$. Lens $414_1$ couples beam $422_1$ into SCEAM $100_1$, where it is modulated to generate a corresponding modulated optical output beam $424_1$. The modulation is performed using the corresponding electrical RF drive signal generated by circuit 640 in response to the data-input signal 638, with the drive signal being applied to SCEAM $100_1$ by way of electrical bus 642. Lens $414_1$ then couples beam $424_1$ into waveguide $416_1$ of circuit 410.

Waveguide $412_2$ similarly outputs the light received from splitter 610 as an optical output beam $422_2$. Lens $414_2$ couples beam $422_2$ into SCEAM $100_2$, where it is modulated to generate a corresponding modulated optical output beam $424_2$. The modulation is performed using the corresponding electrical RF drive signal generated by circuit 640 in response to the data-input signal 638, with the drive signal being applied to SCEAM $100_2$ by way of electrical bus 642. Lens $414_2$ then couples beam $424_2$ into waveguide $416_2$ of circuit 410.

An optical combiner 630 operates to (i) combine the light of modulated optical beams $424_1$ and $424_2$ with a relative phase shift imposed by a phase shifter 620 and (ii) couple the resulting combined optical beam into an optical waveguide 632. Waveguide 632 then directs the received optical beam to an optical output port (e.g., comprising a fiber connector) 634 of circuit 410, from which it can be further directed to external circuits, such as a remote optical receiver (not explicitly shown in FIG. 6).

A person of ordinary skill in the art will recognize that splitter 610, waveguides 412 and 416, phase shifter 620, and combiner 630 are parts of an optical interferometer that can be used to generate more-advanced modulation formats, e.g., compared to the ON-OFF keying (OOK) modulation conventionally used with electro-absorption modulators.

The relative phase shift imposed by phase shifter 620 is a fixed phase shift that depends on the intended modulation format. For example, in some embodiments, the relative phase shift can be 180 degrees. In some other embodiments, the relative phase shift can be, e.g., 90 degrees. In some embodiments, phase shifter 620 can be a tunable phase shifter that enables a slow adjustment of the relative phase shift, e.g., to compensate for fabrication variances, temperature fluctuations, and possibly other instabilities that can affect the relative phase shift in the two arms of the interferometer. Herein, the term "slow" should be construed to mean on a much greater time scale than the inverse baud rate.

Figures 7A, 7B:
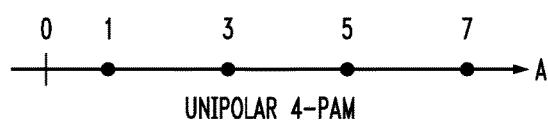
FIGS. 7A-7B illustrate an example configuration of the optical transmitter of FIG. 6 that can be used for pulse-amplitude modulation according to an embodiment.

FIGS. 7A-7B illustrate an example configuration of transmitter 600 that can be used for pulse-amplitude modulation (PAM) according to an embodiment. More specifically, FIG. 7A shows a corresponding unipolar 4-PAM constellation 700. FIG. 7B shows respective settings of SCEAMs $100_1$ and $100_2$ for each constellation point of constellation 700.

In this particular embodiment, phase shifter 620 is configured to apply a relative phase shift of 180 degrees, which causes optical beams $424_1$ and $424_2$ to interfere destructively in combiner 630. Each of SCEAMs $100_1$ and $100_2$ is configured to apply OOK modulation. More specifically, SCEAM $100_1$ is configured for OOK modulation in which the amplitude of the ON signal level is eight relative units, and the amplitude of the OFF signal level is four relative units. SCEAM $100_2$ is configured for OOK modulation in which the amplitude of the ON signal level is three relative units, and the amplitude of the OFF signal level is one relative unit.

The table shown in FIG. 7B shows how different combinations of the ON and OFF signal levels can be used to generate different constellation points of constellation 700 (FIG. 7A). More specifically, to obtain the first amplitude (A=1) of constellation 700, SCEAMs $100_1$ and $100_2$ are driven to be in the OFF and ON states, respectively. To obtain the second amplitude (A=3) of constellation 700, SCEAMs $100_1$ and $100_2$ are driven to be in the OFF and OFF states, respectively. To obtain the third amplitude (A=5) of constellation 700, SCEAMs $100_1$ and $100_2$ are driven to be in the ON and ON states, respectively. To obtain the fourth amplitude (A=7) of constellation 700, SCEAMs $100_1$ and $100_2$ are driven to be in the ON and OFF states, respectively.

Referring back to FIG. 6, due to the polarization-insensitive response of SCEAMs $100_1$ and $100_2$, transmitter 600 has the benefit of being substantially insensitive to polarization fluctuations of the optical beam applied to optical input port 606 thereof. Such polarization fluctuations can be caused, e.g., by ambient conditions of fiber 604 and/or polarization instabilities at laser 602. As a result, transmitter 600 may cost less than a comparable transmitter implemented using waveguide-based EAMs. The cost reduction can be achieved, e.g., by avoiding the use of polarization controllers, polarization-maintaining fibers, and/or other relatively expensive polarization-control equipment.

FIG. 8 shows a block diagram of an optical transmitter 800 configured to generate a PDM optical signal according to an embodiment. Transmitter 800 comprises: (i) an embodiment of SCEAM array 200 (also see FIG. 2C) that includes SCEAMs $100_1$-$100_8$; (ii) an embodiment of planar lightwave circuit 510 (also see FIG. 5); (iii) a lens array 844 that includes lenses $514_1$-$514_8$ (also see FIG. 5); (iv) an electrical circuit 840; (v) a quarter-wavelength ($\lambda$/4) plate 846; and (v) a laser 802. Laser 802 is connected to input port 516 of waveguide circuit 510 using an optical fiber 804. Electrical circuit 840 is connected to SCEAM array 200 using an electrical bus 842. In operation, circuit 840 can (i) provide respective bias voltages to SCEAMs $100_1$-$100_8$ and (ii) generate respective electrical RF drive signals to be applied to SCEAMs $100_1$-$100_8$ in response to an electrical analog data-input signal 838. Quarter-wavelength plate 846 can be inserted between SCEAMs $100_1$-$100_4$ and the ends of waveguides $512_1$-$512_4$ located at edge 526 of circuit 510, e.g., as indicated in FIG. 8.

Optical transmitter 800 can operate, for example, as follows.

Laser 802 operates to generate a CW optical beam that is coupled, by way of fiber 804 and input port 516, into a waveguide 808 of circuit 510. Waveguide 808 directs the received light to optical circulator 520 that redirects it into a waveguide 812. Waveguide 812 further directs the light to an optical coupler 860 that splits it into two portions and couples the two portions into waveguides $858_1$ and $858_2$, respectively. In an example embodiment, optical coupler 860 can be a 3-dB splitter/combiner.

Waveguide $858_1$ directs the light received from optical coupler 860 to a 1×4 optical coupler $830_1$ that splits it into four portions and directs the four portions to waveguides $512i$-$512_4$, respectively, by way of tunable optical attenuators $850_1$-$850_4$ and phase shifters $820i$-$820_4$, as indicated in FIG. 8. Waveguide $858_2$ similarly directs the light received from optical coupler 860 to a 1×4 optical coupler $830_2$ that splits it into four portions and directs the four portions to waveguides $512_5$-$512_8$, respectively, by way of tunable optical attenuators $850_5$-$850_8$ and phase shifters $820_5$-$820_8$, as further indicated in FIG. 8.

In an example embodiment, each of optical couplers $830_1$ and $830_2$ can be a conventional power splitter/combiner operates as a 1×4 splitter for light traveling in one direction and as a 4×1 combiner for light traveling in the opposite direction. Optical attenuators $850_1$-$850_4$ can be used to make adjustments to the effective split ratio of optical coupler $830_1$, e.g., to compensate for fabrication variances and temperature effects and/or to carry out signal pre-distortion. Optical attenuators $850_5$-$850_8$ can similarly be used to make adjustments to the effective split ratio of optical coupler $830_2$.

Splitter $830_1$, optical attenuators $850_1$-$850_4$, phase shifters $820_1$-$820_4$, waveguides $512_1$-$512_4$, and SCEAMs $100_1$-$100_4$ are parts of an optical interferometer $870_1$ that has four arms. The relative phase shifts in the four arms of interferometer $870_1$ can be controlled using phase shifters $820_1$-$820_4$. In an example embodiment, the relative phase shifts can be fixed at approximately 0, 90, 180, and 270 degrees, respectively. Depending on the intended application, the acceptable relative phase-shift tolerances can be, e.g., to within ±5 degrees or ±10 degrees, etc. A person of ordinary skill in the art will understand that each of the relative phase shifts is defined without accounting for a possible additional phase shift that is an integer multiple of 360 degrees. In some embodiments, at least some of phase shifters $820_1$-$820_4$ can be tunable to enable a slow adjustment of the relative phase shifts, e.g., to compensate for fabrication variances, temperature fluctuations, and possibly other instabilities that can affect the relative phase shift in the four arms of interferometer $870_1$. Herein, the term "slow" should be construed to mean on a much greater time scale than the inverse baud rate.

Splitter $830_2$, optical attenuators $850_5$-$850_8$, phase shifters $820_5$-$820_8$, waveguides $512_5$-$512_8$, and SCEAMs $100_5$-$100_8$ are parts of an optical interferometer $870_2$ that is substantially analogous to optical interferometer $870_1$. The relative phase shifts in the four arms of interferometer $870_2$ can similarly be controlled using phase shifters $820_5$-$820_8$. In an example embodiment, these relative phase shifts can be fixed at approximately 0, 90, 180, and 270 degrees, respectively.

Quarter-wavelength plate 846 operates to cause a 90-degree polarization rotation in optical interferometer $870_1$ due to which modulated optical signals generated by optical interferometers $870_1$ and $870_2$ and directed into optical waveguides $858_1$ and $858_2$, respectively, have mutually orthogonal polarizations. For example, if the modulated optical signal generated by optical interferometer $870_1$ has the TE polarization, then the modulated optical signal generated by optical interferometer $870_2$ has the TM polarization. Optical coupler 860 operates to combine the two orthogonally polarized modulated optical signals received from optical waveguides $858_1$ and $858_2$ and apply the resulting PDM modulated optical signal to waveguide 812. Waveguide 812 operates to direct the received PDM signal to optical circulator 520. Optical circulator 520 then operates to direct the received PDM signal, by way of an optical waveguide 810 to optical output port 518, from which it can be further directed to external circuits, such as a remote optical receiver (not explicitly shown in FIG. 8).

Figures 9A, 9B:
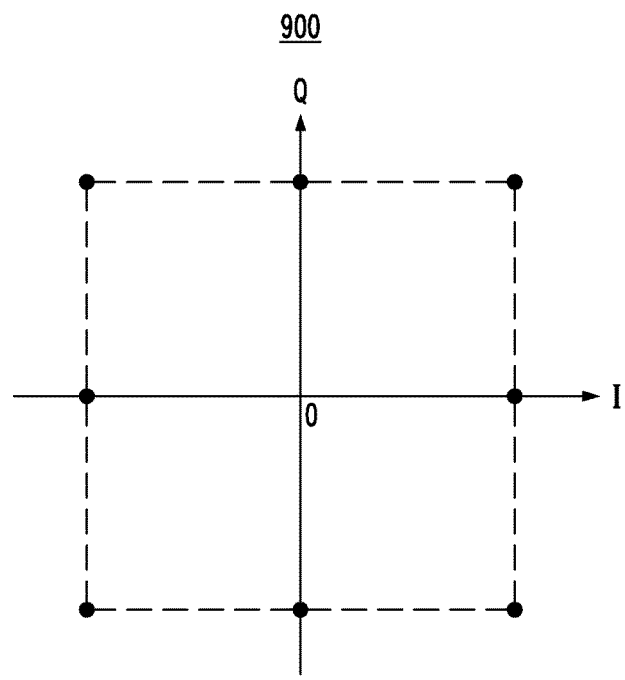
FIGS. 9A-9B illustrate an example configuration of the optical transmitter of FIG. 8 that can be used for quadrature-amplitude modulation according to an embodiment.

FIGS. 9A-9B illustrate an example configuration of transmitter 800 that can be used for quadrature-amplitude modulation (QAM) according to an embodiment. More specifically, FIG. 9A shows a corresponding 8-QAM constellation 900. Constellation 900 can be used to independently modulate each of the two orthogonal polarizations of the PDM signal generated by transmitter 800. FIG. 9B shows respective settings of SCEAMs $100_1$-$100_4$ for each constellation point of constellation 900, as applied to the first (e.g., TE) polarization. A person of ordinary skill in the art will understand that similar settings can be used for SCEAMs $100_5$-$100_8$ to apply constellation 900 to the orthogonal second (e.g., TM) polarization.

In this particular embodiment, phase shifters $820_1$-$820_4$ are configured to generate the relative phase shifts of 0, 90, 180, and 270 degrees, respectively. Each of SCEAMs $100_1$-$100_4$ is configured to apply OOK modulation. More specifically, in the ON state, each of SCEAMs $100_1$-$100_4$ outputs a signal whose amplitude is one relative unit. In the OFF state, each of SCEAMs $100_1$-$100_4$ substantially fully extinguishes the light.

Referring to FIG. 9A, constellation 900 has eight constellation points that have the respective coordinates on the complex IQ plane represented by the following complex numbers: 1; 1+j; j; −1+j; −1; −1−j; −j; and 1−j. Note that constellation 900 includes a subset of constellation points representing a quadrature-phase-shift-keying (QPSK) constellation. This subset has four constellation points having the following respective coordinates on the complex IQ plane: 1; j; −1; and −j. This fact implies that transmitter 800 can also be used for QPSK modulation.

The table shown in FIG. 9B shows how different combinations of the ON and OFF states of SCEAMs $100_1$-$100_4$ can be used to generate different constellation points of constellation 900 (FIG. 9A). For example, to generate the first constellation point having the IQ coordinates of (1,0), SCEAMs $100_1$-$100_4$ are driven to be in the ON, OFF, OFF, and OFF states, respectively. To generate the second constellation point having the IQ coordinates of (1,1), SCEAMs $100_1$-$100_4$ are driven to be in the ON, ON, OFF, and OFF states, respectively. To generate the third constellation point having the IQ coordinates of (0,1), SCEAMs $100_1$-$100_4$ are driven to be in the OFF, ON, OFF, and OFF states, respectively, and so on.

Referring back to FIG. 8, due to the polarization-insensitive response of SCEAMs $100_1$-$100_8$, transmitter 800 has the benefit of being substantially insensitive to polarization fluctuations of the optical beam applied to optical input port 516 thereof and can generate a corresponding PDM output signal at optical output port 518 thereof in a polarization-diverse manner. As a result, transmitter 800 may cost less than a comparable transmitter implemented using waveguide-based EAMs. The cost reduction can be achieved, e.g., by avoiding the use of polarization controllers, polarization-maintaining fibers, and/or other relatively expensive polarization-control equipment.

According to an example embodiment disclosed above, e.g., in the summary section and/or in reference to any one or any combination of some or all of FIGS. 1-9, provided is an apparatus (e.g., 800, FIG. 8) comprising: a plurality of reflective electro-absorption modulators (e.g., $100_1$-$100_8$, FIG. 8) supported on a planar surface (e.g., 214, FIG. 8), each of the reflective electro-absorption modulators being configured to receive input light and output modulated light substantially (e.g., within ±10 degrees) orthogonally to the planar surface; and an optical circuit (e.g., 410, FIG. 6; 510, FIG. 8) optically coupled to the plurality of reflective electro-absorption modulators to form a first optical interferometer (e.g., $870_1$, FIG. 8) having a plurality of interferometer arms, each of the interferometer arms including a respective one of the reflective electro-absorption modulators (e.g., $100_1$-$100_4$, FIG. 8) and being configured to apply a different respective phase shift to light propagating therethrough; and wherein the first optical interferometer comprises a first optical coupler (e.g., $830_1$, FIG. 8) configured to generate a first modulated optical signal by optically combining the modulated light outputted by the respective reflective electro-absorption modulators in the plurality of interferometer arms in response to the input light.

In some embodiments of the above apparatus, the first optical interferometer comprises a first phase shifter (e.g., 620, FIG. 6; $820_3$, FIG. 8) configured to cause two of the different respective phase shifts to have a difference of approximately (e.g., to within ±10 degrees) 180 degrees.

In some embodiments of any of the above apparatus, the first optical interferometer comprises first, second, and third phase shifters (e.g., $820_2$-$820_4$, FIG. 8); wherein the first phase shifter is configured to cause the different respective phase shifts of a first interferometer arm and a second interferometer arm to have a difference of approximately (e.g., to within ±10 degrees) 90 degrees; wherein the second phase shifter is configured to cause the different respective phase shifts of the first interferometer arm and a third interferometer arm to have a difference of approximately (e.g., to within ±10 degrees) 180 degrees; and wherein the third phase shifter is configured to cause the different respective phase shifts of the first interferometer arm and a fourth interferometer arm to have a difference of approximately (e.g., to within ±10 degrees) 270 degrees.

In some embodiments of any of the above apparatus, the first optical interferometer is configured to cause the modulated light from a first of the interferometer arms and a second of the interferometer arms to be combined in the first optical coupler with a relative phase of approximately 180 degrees.

In some embodiments of any of the above apparatus, the first optical interferometer is further configured to cause the modulated light from the first of the interferometer arms and a third of the interferometer arms to be combined in the first optical coupler with a relative phase of approximately 90 degrees.

In some embodiments of any of the above apparatus, the first optical interferometer is configured to cause the modulated light from the first of the interferometer arms and a fourth of the interferometer arms to be combined in the first optical coupler with a relative phase of approximately 270 degrees.

In some embodiments of any of the above apparatus, the first optical interferometer comprises a polarization rotator (e.g., 846, FIG. 8) configured to cause the first modulated optical signal to have polarization that is orthogonal to polarization of the input light.

In some embodiments of any of the above apparatus, at least some of the interferometer arms include respective tunable optical attenuators (e.g., some of 850$_1$-850$_4$, FIG. 8). In some embodiments, some of the tunable optical attenuators (e.g., 850$_1$ and/or 850$_5$, FIG. 8) can be absent.

In some embodiments of any of the above apparatus, each of the interferometer arms includes a respective tunable optical attenuator (e.g., 850$_1$-850$_4$, FIG. 8).

In some embodiments of any of the above apparatus, each of the reflective electro-absorption modulators comprises a respective semiconductor diode (e.g., 110/112/118, FIG. 1) that includes a respective multiple-quantum-well structure (e.g., 112, FIG. 1).

In some embodiments of any of the above apparatus, each of the respective semiconductor diodes comprises a respective plurality of thin semiconductor layers (e.g., 110/112/114/116/118, FIG. 1) oriented substantially (e.g., within ±10 degrees) parallel to the planar surface.

In some embodiments of any of the above apparatus, the apparatus further comprises: an electrical circuit (e.g., 840, FIG. 8) connected to electrically drive the reflective electro-absorption modulators in response to an input data signal (e.g., 838, FIG. 8); and a device carrier (e.g., 202, FIGS. 2C, 8) that comprises the planar surface, the device carrier being configured to electrically connect the reflective electro-absorption modulators to the electrical circuit.

In some embodiments of any of the above apparatus, each of the reflective electro-absorption modulators comprises a respective optical resonator bounded by a respective first mirror (e.g., 106, FIG. 1) and a respective second mirror (e.g., 130, FIG. 1), the first mirror being a non-transparent metal mirror and the second mirror being a partially transparent dielectric mirror.

In some embodiments of any of the above apparatus, each of the respective optical resonators comprises a respective semiconductor diode (e.g., 110/112/118, FIG. 1) that includes a respective multiple-quantum-well structure (e.g., 112, FIG. 1).

In some embodiments of any of the above apparatus, the optical circuit is optically coupled to the plurality of reflective electro-absorption modulators to form a second optical interferometer (e.g., 870$_2$, FIG. 8) having a plurality of second interferometer arms, each of the second interferometer arms including a respective one of the reflective electro-absorption modulators (e.g., 100$_5$-100$_8$, FIG. 8); wherein the second optical interferometer comprises a second optical coupler (e.g., 830$_2$, FIG. 8) configured to generate a second modulated optical signal by optically combining the modulated light outputted by the respective reflective electro-absorption modulators in the second interferometer arms in response to the input light; and wherein the optical circuit comprises a third optical coupler (e.g., 860, FIG. 8) configured to generate an optical output signal by optically combining the first modulated optical signal received from the first optical coupler and the second modulated optical signal received from the second optical coupler.

In some embodiments of any of the above apparatus, the apparatus further comprises a polarization rotator (e.g., 846, FIG. 8) configured to cause the first modulated optical signal and the second modulated optical signal to have mutually orthogonal polarizations.

In some embodiments of any of the above apparatus, the polarization rotator is further configured to cause polarization of the first modulated optical signal to be orthogonal to polarization of the input light.

In some embodiments of any of the above apparatus, the apparatus further comprises a laser (e.g., 602, FIG. 6; 802, FIG. 8) configured to generate the input light.

In some embodiments of any of the above apparatus, the apparatus further comprises an optical fiber (e.g., 604, FIG. 6; 804, FIG. 8) configured to transmit the input light from the laser to the optical circuit, the optical fiber causing polarization of the input light to fluctuate.

In some embodiments of any of the above apparatus, the optical circuit comprises a planar lightwave circuit whose main plane is substantially orthogonal to the planar surface.

In some embodiments of any of the above apparatus, the optical circuit comprises an optical circulator (e.g., 310, FIG. 3; 520, FIGS. 5, 8).

In some embodiments of any of the above apparatus, the apparatus further comprises an optical data transmitter (e.g., 600, FIG. 6; 800, FIG. 8) that includes the plurality of reflective electro-absorption modulators and the optical circuit.

In some embodiments of any of the above apparatus, the first optical coupler is further configured to couple the input light into the plurality of interferometer arms.

In some embodiments of any of the above apparatus, the apparatus further comprises an electrical circuit (e.g., 840, FIG. 8) connected to electrically drive the reflective electro-absorption modulators in response to an input data signal (e.g., 838, FIG. 8) such that the first optical coupler outputs light modulated according to a quadrature-phase-shift-keying constellation (e.g., a subset of 900, FIG. 9A).

In some embodiments of any of the above apparatus, the apparatus further comprises an electrical circuit (e.g., 840, FIG. 8) connected to electrically drive the reflective electro-absorption modulators in response to an input data signal (e.g., 838, FIG. 8) such that the first optical coupler outputs light modulated according to a quadrature-amplitude-modulation constellation (e.g., 900, FIG. 9A).

In some embodiments of any of the above apparatus, the first optical interferometer is configured to cause the modulated light from a first of the interferometer arms and a second of the interferometer arms to be combined in the first optical coupler with a first relative phase.

In some embodiments of any of the above apparatus, the first optical interferometer is configured to cause the modulated light from the first of the interferometer arms and a third of the interferometer arms to be combined in the optical coupler with a second relative phase different from the first relative phase.

In some embodiments of any of the above apparatus, the first optical interferometer is configured to cause the modulated light from the first of the interferometer arms and a fourth of the interferometer arms to be combined in the optical coupler with a third relative phase different from each of the first and the second relative phases.

In some embodiments of any of the above apparatus, at least some of the first, second, and third relative phases differ from approximately 90 degrees, approximately 180 degrees, and approximately 270 degrees, respectively. The corresponding interferometer configuration(s) can be achieved, e.g., by properly selecting the parameters of the interferometer arms and/or tuning some or all of phase shifters 820 (FIG. 8). Various additional constellations may be generated by applying at least some of the driving configurations corresponding to constellations 700 (FIG. 7A) and 900 (FIG. 9A) to different ones of phase shifters 820 (FIG. 8).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the layers are horizontal but would be horizontal where the layers are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus comprising:
a plurality of reflective electro-absorption modulators supported along a planar surface, each of the reflective electro-absorption modulators being configured to receive input light and output modulated light substantially orthogonally to the planar surface; and
an optical circuit optically coupled to the plurality of reflective electro-absorption modulators to form a first optical interferometer having a plurality of interferometer arms, each of the interferometer arms including a respective one of the reflective electro-absorption modulators;
wherein the first optical interferometer comprises a first optical coupler configured to generate a first modulated optical signal by optically combining the modulated light outputted by the respective reflective electro-absorption modulators in the plurality of interferometer arms in response to receipt of the input light; and
wherein the first optical interferometer comprises a polarization rotator configured to cause the first modulated optical signal to have polarization that is orthogonal to polarization of the input light.

2. The apparatus of claim 1, wherein the first optical interferometer is configured to cause the modulated light from a first of the interferometer arms and a second of the interferometer arms to be combined in the first optical coupler with a relative phase of approximately 180 degrees.

3. The apparatus of claim 2, wherein the first optical interferometer is further configured to cause the modulated light from the first of the interferometer arms and a third of the interferometer arms to be combined in the first optical coupler with a relative phase of approximately 90 degrees.

4. The apparatus of claim 3, wherein the first optical interferometer is configured to cause the modulated light from the first of the interferometer arms and a fourth of the interferometer arms to be combined in the first optical coupler with a relative phase of approximately 270 degrees.

5. The apparatus of claim 1, further comprising an electrical circuit connected to electrically drive the reflective electro-absorption modulators in response to an input data signal such that the first optical coupler outputs light modulated according to a quadrature-amplitude-modulation constellation.

6. The apparatus of claim 1, wherein at least some of the interferometer arms include respective tunable optical attenuators.

7. The apparatus of claim 1, wherein each of the reflective electro-absorption modulators comprises a respective semiconductor diode that includes respective multiple quantum wells.

8. The apparatus of claim 7, wherein each of the respective semiconductor diodes comprises a respective plurality of thin semiconductor layers oriented substantially parallel to the planar surface.

9. The apparatus of claim 1, further comprising:
an electrical circuit connected to electrically drive the reflective electro-absorption modulators in response to an input data signal; and
a device carrier that comprises the planar surface, the device carrier being configured to electrically connect the reflective electro-absorption modulators to the electrical circuit.

10. The apparatus of claim 1, wherein each of the reflective electro-absorption modulators comprises a respective optical resonator bounded by a respective first optical reflector and a respective second optical reflector, the first optical reflector being a metal mirror and the second optical reflector being a partially transparent multilayer dielectric optical reflector.

11. The apparatus of claim 10, wherein each of the respective optical resonators comprises a respective semiconductor diode that includes respective multiple quantum wells.

12. The apparatus of claim 1, further comprising a laser configured to generate the input light.

13. The apparatus of claim 12, further comprising an optical fiber configured to transmit the input light from the laser to the optical circuit, the optical fiber causing polarization of the input light to fluctuate.

14. The apparatus of claim 1, wherein the optical circuit comprises a planar lightwave circuit whose main plane is substantially orthogonal to the planar surface.

15. The apparatus of claim 1, wherein the optical circuit comprises an optical circulator.

16. The apparatus of claim 1, further comprising an optical data transmitter that includes the plurality of reflective electro-absorption modulators and the optical circuit.

17. The apparatus of claim 1, wherein the first optical coupler is further configured to couple the input light into the plurality of interferometer arms.

18. The apparatus of claim 1, further comprising an electrical circuit connected to electrically drive the reflective electro-absorption modulators in response to an input data signal such that the first optical coupler outputs light modulated according to a quadrature-phase-shift-keying constellation.

19. The apparatus of claim 1, wherein the first optical interferometer is configured to cause the modulated light from a first of the interferometer arms and a second of the interferometer arms to be combined in the optical coupler with a first relative phase.

20. The apparatus of claim 19, wherein the first optical interferometer is configured to cause the modulated light from the first of the interferometer arms and a third of the interferometer arms to be combined in the optical coupler with a second relative phase different from the first relative phase.

21. The apparatus of claim 20, wherein the first optical interferometer is configured to cause the modulated light from the first of the interferometer arms and a fourth of the interferometer arms to be combined in the optical coupler with a third relative phase different from each of the first and the second relative phases.

22. An apparatus comprising:
a plurality of reflective electro-absorption modulators supported along a planar surface, each of the reflective electro-absorption modulators being configured to receive input light and output modulated light substantially orthogonally to the planar surface; and
an optical circuit optically coupled to the plurality of reflective electro-absorption modulators to form a first optical interferometer having a plurality of interferometer arms, each of the interferometer arms including a respective one of the reflective electro-absorption modulators;
wherein the first optical interferometer comprises a first optical coupler configured to generate a first modulated optical signal by optically combining the modulated light outputted by the respective reflective electroabsorption modulators in the plurality of interferometer arms in response to receipt of the input light;

wherein the optical circuit is optically coupled to the plurality of reflective electro-absorption modulators to form a second optical interferometer having a plurality of second interferometer arms, each of the second interferometer arms including a respective one of the reflective electro-absorption modulators;

wherein the second optical interferometer comprises a second optical coupler configured to generate a second modulated optical signal by optically combining the modulated light outputted by the respective reflective electro-absorption modulators in the second interferometer arms in response to receipt of the input light; and wherein the optical circuit comprises a third optical coupler configured to generate an optical output signal by optically combining the first modulated optical signal received from the first optical coupler and the second modulated optical signal received from the second optical coupler.

23. The apparatus of claim 22, further comprising a polarization rotator configured to cause the first modulated optical signal and the second modulated optical signal to have mutually orthogonal polarizations at an output of the third optical coupler.

24. The apparatus of claim 23, wherein the polarization rotator is further configured to cause polarization of the first modulated optical signal to be orthogonal to polarization of the input light.

25. An apparatus comprising:
first and second reflective electro-absorption modulators supported along a planar surface, each of the first and second reflective electro-absorption modulators being configured to receive input light and output modulated light substantially orthogonally to the planar surface; and an optical circuit optically coupled to the first and second reflective electro-absorption modulators to form an optical interferometer having first and second interferometer arms, each of the first and second interferometer arms including a respective one of the first and second reflective electro-absorption modulators;

wherein the optical interferometer comprises an optical coupler configured to generate a modulated optical signal by optically combining the modulated light outputted by the first and second reflective electro-absorption modulators in response to receipt of the input light; and wherein the apparatus further comprises an electrical circuit connected to electrically drive the first and second reflective electro-absorption modulators in response to an input data signal such that the optical coupler outputs light modulated according to a pulse-amplitude-modulation constellation having more than two different amplitude levels.

26. The apparatus of claim 25, wherein the pulse-amplitude-modulation (PAM) constellation is a unipolar 4-PAM constellation.

27. The apparatus of claim 25, wherein the electrical circuit is configured to electrically drive the first and second reflective electro-absorption modulators such that optical signals outputted by the first and second reflective electro-absorption modulators in a same time slot have different respective intensities.

28. The apparatus of claim 25, wherein the electrical circuit is configured to electrically drive the first and second reflective electro-absorption modulators such that optical signals outputted by the first and second reflective electro-absorption modulators have different maximum intensities.

29. The apparatus of claim 25, wherein the optical interferometer comprises a phase shifter configured to provide for about destructive interference of the modulated light outputted by the first and second reflective electro-absorption modulators when interfered.

* * * * *